United States Patent
Niwa et al.

(10) Patent No.: US 10,343,132 B2
(45) Date of Patent: Jul. 9, 2019

(54) PLASMA EMITTING METHOD AND PLASMA EMITTING DEVICE

(71) Applicant: FUJI CORPORATION, Chiryu (JP)

(72) Inventors: Akihiro Niwa, Anjo (JP); Takahiro Jindo, Anjo (JP); Toshiyuki Ikedo, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 186 days.

(21) Appl. No.: 15/314,047

(22) PCT Filed: May 30, 2014

(86) PCT No.: PCT/JP2014/064404
§ 371 (c)(1),
(2) Date: Nov. 25, 2016

(87) PCT Pub. No.: WO2015/181945
PCT Pub. Date: Dec. 3, 2015

(65) Prior Publication Data
US 2017/0182473 A1    Jun. 29, 2017

Related U.S. Application Data

(63) Continuation of application No. PCT/JP2014/064404, filed on May 30, 2014.

(51) Int. Cl.
*B01J 19/08* (2006.01)
*C01B 13/11* (2006.01)
*C02F 1/46* (2006.01)
*H05H 1/24* (2006.01)

(52) U.S. Cl.
CPC .............. *B01J 19/08* (2013.01); *C01B 13/11* (2013.01); *C02F 1/4608* (2013.01);
(Continued)

(58) Field of Classification Search
None
See application file for complete search history.

(56) References Cited

U.S. PATENT DOCUMENTS

| | | |
|---|---|---|
| 6,328,898 B1 | 12/2001 | Akiyama et al. |
| 2004/0131513 A1* | 7/2004 | Lazarovich .......... B01D 53/326 422/186.04 |

(Continued)

FOREIGN PATENT DOCUMENTS

| | | |
|---|---|---|
| EP | 2009-22865 A | 2/2009 |
| EP | 3 006 408 A1 | 4/2016 |

(Continued)

OTHER PUBLICATIONS

International Search Report dated Aug. 19, 2014, in PCT/JP2014/064404, filed May 30, 2014.

(Continued)

*Primary Examiner* — Kishor Mayekar
(74) *Attorney, Agent, or Firm* — Oblon, McClelland, Maier & Neustadt, L.L.P.

(57) ABSTRACT

Water is flowed inside main body section formed from an insulating material such that a specified space remains inside the main body section. Electrodes and are arranged along the outer walls of the main body section and voltage is applied to the electrodes. Processing gas present inside the main body section is plasmarized and plasma is emitted to the water flowing inside the main body section.

5 Claims, 8 Drawing Sheets

(52) U.S. Cl.
    CPC .... *H05H 1/2406* (2013.01); *B01J 2219/0809* (2013.01); *B01J 2219/0824* (2013.01); *B01J 2219/0877* (2013.01); *B01J 2219/0894* (2013.01); *C01B 2201/22* (2013.01); *H05H 2001/2462* (2013.01)

(56) References Cited

U.S. PATENT DOCUMENTS

| | | | |
|---|---|---|---|
| 2006/0127271 A1* | 6/2006 | Ruan | A23L 3/26 422/22 |
| 2006/0185594 A1 | 8/2006 | Uehara et al. | |
| 2010/0126940 A1 | 5/2010 | Ryu et al. | |
| 2016/0074829 A1 | 3/2016 | Kitano et al. | |

FOREIGN PATENT DOCUMENTS

| | | |
|---|---|---|
| JP | 08-183107 A | 7/1996 |
| JP | 2001-9463 A | 1/2001 |
| JP | 2005-302685 A | 10/2005 |
| JP | 2009-160494 A | 7/2009 |
| JP | 2010-523326 A | 7/2010 |
| JP | 2010-540208 A | 12/2010 |
| JP | 2013-211204 A | 10/2013 |
| JP | 2014-002936 A | 1/2014 |
| JP | 2014-010931 A | 1/2014 |
| WO | 2012/14791 | 11/2012 |

OTHER PUBLICATIONS

Search Report dated Feb. 1, 2018 in the corresponding European Application No. 14893492.0 (citing documents AA, AO and AP therein 7 pages).

Japanese Office Action dated Oct. 2, 2018 in Japanese Patent Application No. 2016-523051 (submitting English translation only), citing document AO therein, 4 pages.

* cited by examiner

PLASMA EMITTING METHOD AND PLASMA EMITTING DEVICE

TECHNICAL FIELD

The present application relates to a plasma emitting method of emitting plasma to a liquid and to a plasma emitting device that emits plasma to a liquid.

BACKGROUND ART

It is known that highly oxidized liquid can be generated by emitting plasma to a liquid so that radicals dissolve in the liquid. With a highly oxidized liquid it is possible to effectively perform cleanup processing such as disinfecting, sterilizing, cleaning of waste liquid, and cleaning of exhaust gases. Also, the use of highly oxidized liquid in medical fields is being investigated. Thus, in recent years, as disclosed in the patent literature below, technology developments are being made for emitting plasma to a liquid.
Patent Literature 1: JP-A-2009-160494
Patent Literature 2: JP-A-2014-10931
Patent Literature 1: JP-A-2001-9463

SUMMARY

According to technology disclosed in the above patent literature, it is possible to emit plasma to a liquid. However, with the technology disclosed in patent literature 1 and 2, plasma processing is performed on the liquid by applying a voltage to an electrode immersed in liquid. Therefore, there is a concern that impurities such as constituents of the electrode will dissolve in the liquid. Also, with the technology disclosed in patent literature 3, plasma is emitted to a liquid by vaporizing gas with an electrode not immersed in liquid, but the liquid that is the target for plasma processing is a liquid in a container. This means that plasma can only be emitted to a small amount of liquid. Also, because plasma is emitted to a small amount of liquid, there is a concern that the temperature of the liquid will become high. Therefore, there remains considerable room for improvement of a method and device for emitting plasma to a liquid, and by performing various improvements it is possible to improve the practicality of a plasma emitting method and a plasma emitting device. The present disclosure take account of such problems and an object thereof is to provide a highly practical plasma emitting method and plasma emitting device.

To solve the above problems, the present application discloses a plasma emitting method of emitting plasma to a liquid, the plasma emitting method including: a liquid flowing step of flowing a liquid inside a tubular member formed from an insulating material such that a specified space remains inside the tubular member; and a plasmarizing step of plasmarizing gas present in the specified space by applying voltage to a pair of electrodes arranged along outer walls of the tubular member.

To solve the above problems, the present application discloses a plasma emitting device including: a tubular member formed from an insulating material; a pair of electrodes arranged along outer walls of the tubular member; and a flow device that flows a liquid inside the tubular member such that a specified space remains inside the tubular member; wherein plasma is emitted to the liquid flowing inside the tubular member by gas present in the specified space being plasmarized by voltage being applied to the pair of electrodes.

Advantageous Effects

With the plasma emitting method and plasma emitting device disclosed in the present application, liquid is flowed inside a tubular member formed from an insulating material such that a specified space remains inside the tubular member. Also, a pair of electrodes are arranged along the outer walls of the tubular member, with voltage being applied to the pair of electrodes. Accordingly, gas present inside the tubular member is plasmarized, and plasma is emitted to the liquid flowing inside the tubular member. In this way, with the plasma emitting method and plasma emitting device disclosed in the present application, gas is plasmarized and plasma is emitted to a liquid by electrodes that are not immersed in the liquid. Therefore, it is not necessary to consider the intrusion of impurities to the liquid and so on due to the electrodes dissolving. Also, with the plasma emitting method and plasma emitting device disclosed in the present application, because plasma is emitted to flowing liquid, it is possible to emit plasma to a large quantity of liquid, thus highly oxidized liquid is created efficiently. Also, because plasma is emitted to flowing liquid, it is possible to curtail an increase in the temperature of the liquid due to plasma being emitted. In this manner, according to technology disclosed in this application, it is possible to improve the practicality of a plasma emitting method and a plasma emitting device.

DESCRIPTION OF PREFERRED EMBODIMENTS

Figure 1:
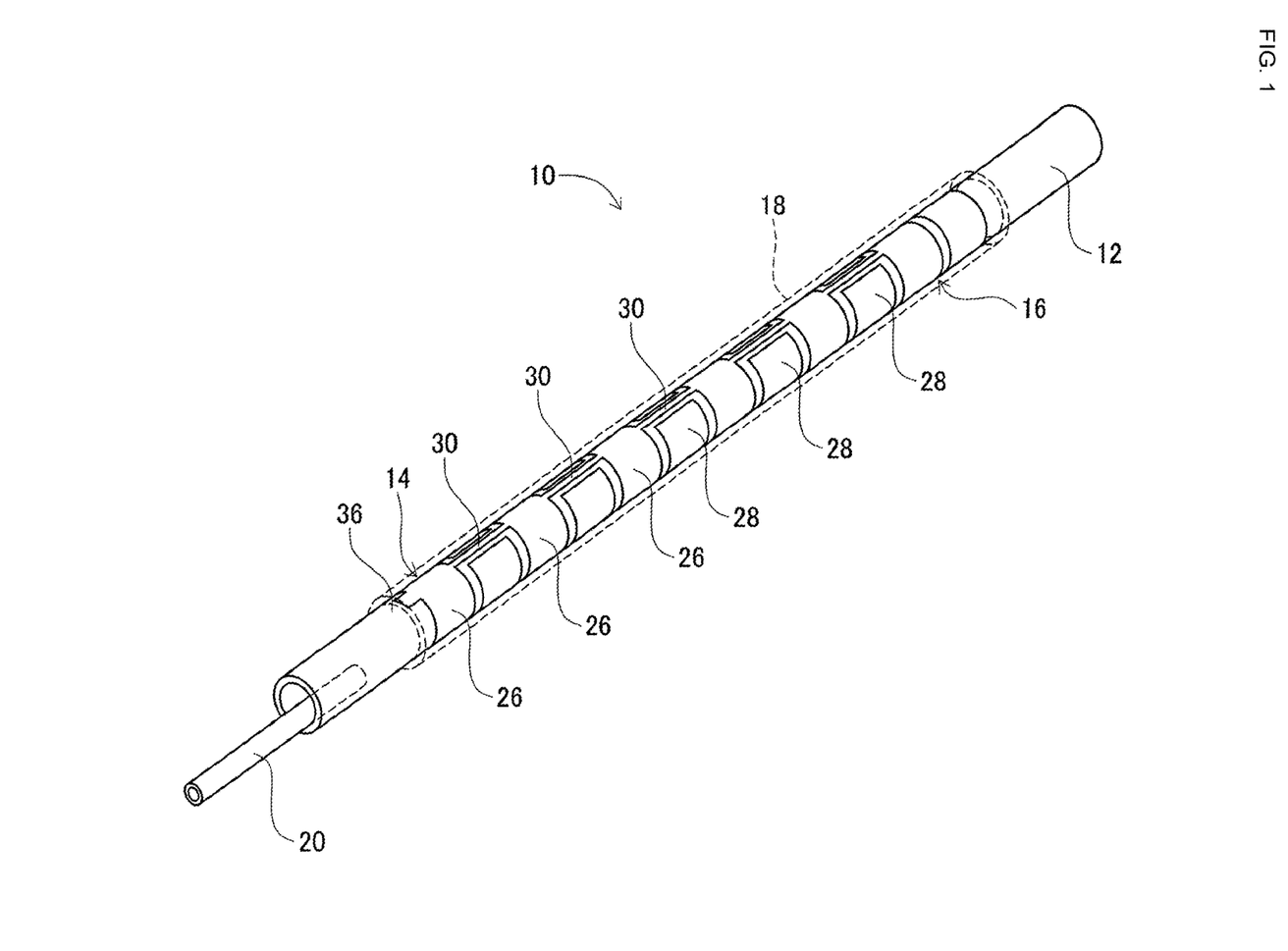
FIG. 1 is a perspective view showing a plasma emitting device that is an embodiment of the present disclosure.

The following describes in detail referring to the figures an example embodiment of the present disclosure.
Configuration of Plasma Emitting Device
FIG. 1 shows an embodiment of the present disclosure, plasma emitting device 10. Plasma emitting device 10 emits plasma to water such that plasma-processed water is generated. Plasma emitting device 10 is provided with main body section 12, pair of electrodes 14 and 16, glass pipe 18, flow pipe 20, and bubble generating device (refer to FIG. 3) 22.

Figure 2:
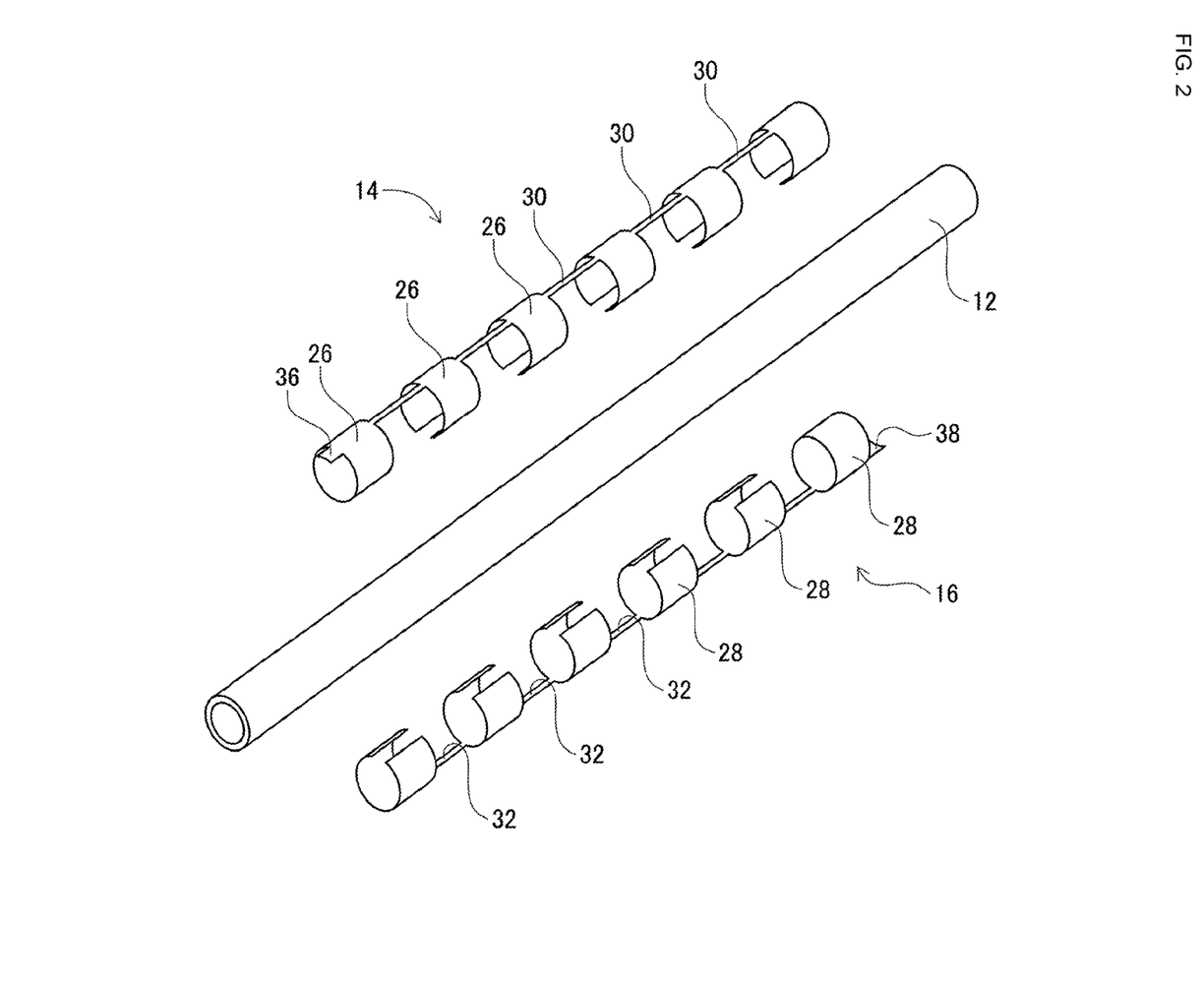
FIG. 2 is an exploded view showing electrodes removed from the main body section of FIG. 1.

Main body section 12 is formed from sapphire glass and is substantially a round tube. Multiple electrical discharge sections 26 and 28 of the pair of electrodes 14 and 16 are vacuum deposited on the outer circumferential surface of main body section 12 so as to be lined up alternately in an axis direction of main body section 12. In detail, as shown in FIG. 2, electrode 14 includes multiple electrical discharge sections 26 and connecting sections 30, and electrode 16 includes multiple electrical discharge sections 28 and connecting sections 32. FIG. 2 is a theoretical view showing electrodes 14 and 16 removed from main body section 12.

The multiple electrical discharge sections 26 of electrode 14 are vacuum deposited on the outer circumferential surface of main body section 12 extending in the circumferential direction, and are arranged at a specified interval lined up in the axis direction of main body section 12. Also, connecting sections 30 of electrode 14 are vacuum deposited on the outer circumferential surface of main body section 12 extending in a line in the axis direction of main body section 12, and are connected to the multiple electrical discharge sections 26. Note that, from among the multiple electrical discharge sections 26 of electrode 14, electrical discharge section 26 positioned at one end is vacuum deposited around the entire circumference in the circumferential direction of main body section 12; the other electrical discharge sections 26 are vacuum deposited extending in the circumferential direction of main body section 12, except for a portion on the opposite side to connecting section 30. Also, current passing section 36 is formed on the electrical discharge section 26 vacuum deposited across the entire circumference in the circumferential direction of main body section 12 protruding from an end of main body section 12.

Further, the multiple electrical discharge sections 28 of electrode 16 are vacuum deposited on the outer circumferential surface of main body section 12 extending in the circumferential direction, and are arranged lined up in the axis direction of main body section 12 so as to be positioned between the multiple electrical discharge sections 26 of electrode 14. Note that, from among the multiple electrical discharge sections 28 of electrode 16, electrical discharge sections 28 positioned between two of the electrical discharge sections 26 of electrode 14 are vacuum deposited extending in the circumferential direction of main body section 12 excluding connecting section 30 of electrode 14; the remaining electrical discharge sections 28 positioned at the ends are vacuum deposited across the entire circumference in the circumferential direction of main body section 12. Current passing section 38 is formed on the electrical discharge section 28 vacuum deposited across the entire circumference in the circumferential direction of main body section 12 protruding from an end of main body section 12. Also, connecting sections 32 of electrode 16 are vacuum deposited on the outer circumferential surface of main body section 12 extending in a line in the axis direction of main body section 12 at locations where electrical discharge sections 26 of electrode 14 are not vacuum deposited, and are connected to the multiple electrical discharge sections 28. Thus, the pair of electrodes 14 and 16 have electrical discharge sections 26 of electrode 14 and electrical discharge sections 28 of electrode 16 vacuum deposited on the outer circumferential surface of main body section 12 lined up alternately with a specified gap between them.

Also, as shown in FIG. 1, glass tube 18 is arranged on the outer circumferential surface of main body section 12 so as to entirely cover the pair of electrodes 14 and 16 vacuum deposited on the outer circumferential surface of main body section 12. By this, it is possible to prevent exposure of electrodes 14 and 16, through which high voltage is applied, thereby maintaining safety. Note that, because electrodes 14 and 16 are encased by glass pipe 18, glass pipe 18 encroaches in between electrical discharge sections 26 of electrode 14 and electrical discharge sections 28 of electrode 16.

Figure 3:
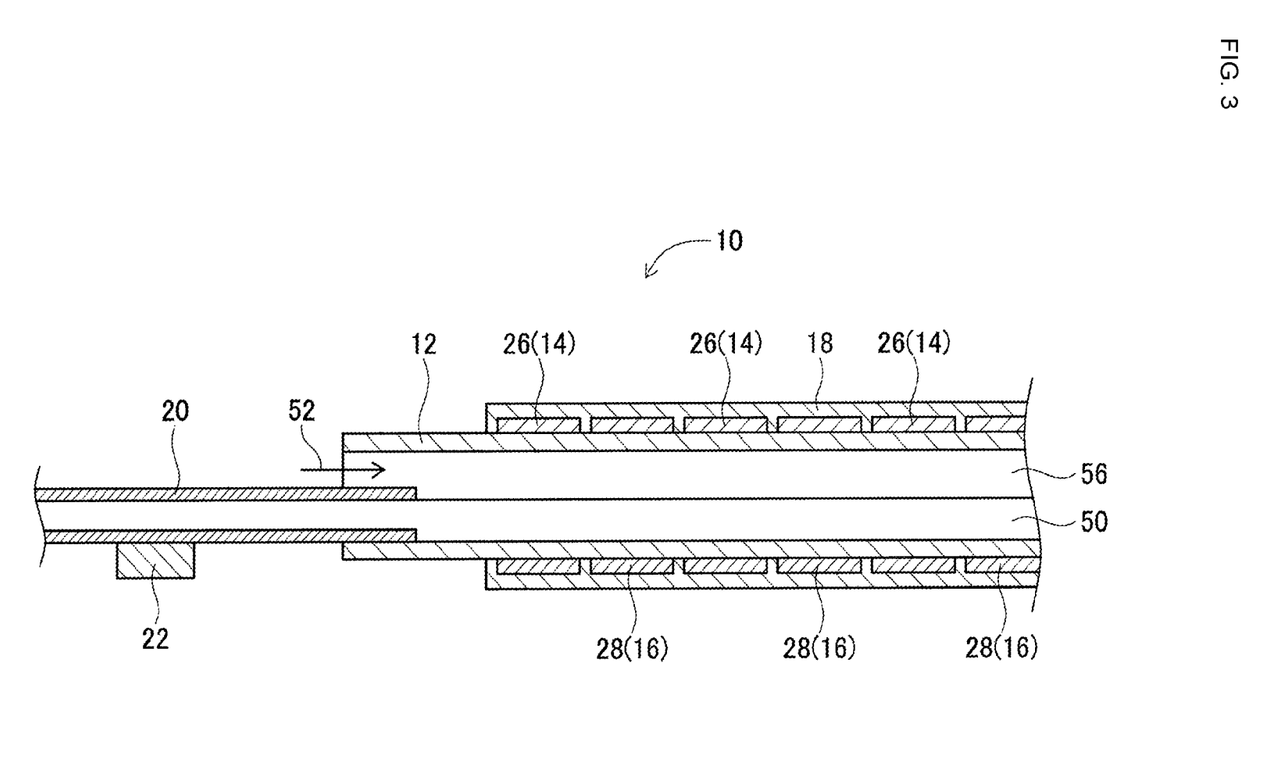
FIG. 3 is a cross section of the plasma emitting device of FIG. 1.

Also, flow pipe 20 is for flowing water through the inside of main body section 12, and the outer diameter of flow pipe 20 is approximately half the internal diameter of main body section 12. Further, as shown in FIG. 3, flow pipe 20 is inserted inside main body section 12. Note that, an end section of flow pipe 20, that is, the outlet for ejecting water, is inserted inside main body section 12 to be positioned between a position corresponding to a location where electrode 14 is vacuum deposited and the end of main body section 12 into which flow pipe 20 is inserted. Also, a pump (not shown) is connected to the other end section of flow pipe 20. Thus, water 50 is flowed through the inside of main body section 12 via flow pipe 20.

Also, bubble generating device 22 is provided on flow pipe 20 at a location not inserted inside main body section 12. Bubble generating device 22 is for generating bubbles inside water flowing inside flow pipe 20. By this, water 50 containing bubbles is flowed inside main body section 12 via flow pipe 20.

Emitting Plasma to Water Using the Plasma Emitting Device

According to the above configuration, plasma emitting device 10 is able to generate plasma-processed water by emitting plasma to water flowing inside main body section 12. In detail, water is flowed inside main body section 12 via flow pipe 20 due to operation of a pump. Here, because bubbles are generated in the water inside flow pipe 20 by bubble generating device 22, water 50 flowing inside main body section 12 contains bubbles.

Further, processing gas 56 is supplied in the direction of arrow 52 from between main body section 12 and flow pipe 20 by a gas supply device (not shown). By this, inside main body section 12, water 50 containing bubbles supplied from flow pipe 20 and processing gas 56 supplied from the gas supply device flow from one end to the other end of main body section 12. Note that, processing gas 56 may be gas in which an inert gas such as nitrogen is mixed with active gases in the air such as oxygen at a given ratio, or may be only an inert gas, or only air.

When water 50 and processing gas 56 flow inside main body section 12, voltage is applied to current passing sections 36 and 38 of the pair of electrodes 14 and 16, such that current flows through the pair of electrodes 14 and 16. By this, electrical discharge is generated between electrical discharge sections 26 and 28 of the pair of electrodes 14 and 16. Here, because electrodes 14 and 16 are encased by glass pipe 18, which is an insulating body, electrical discharge is generated inside main body section 12 such that the processing gas flowing inside main body section 12 is plasmarized. By this, plasma is emitted to water 50 flowing inside main body section 12, and water to which plasma has been emitted, that is, plasma-processed water, is ejected from the end section of main body section 12.

Note that, the gas including bubbles that is generated by bubble generating device 22 may be gas in which an inert gas such as nitrogen is mixed with active gases in the air such as oxygen at a given ratio, or may be only an inert gas, or only air. In this way, by including gas in water 50, processing gas included in water 50 is also plasmarized by electrical discharge generated between electrical discharge sections 26 and 28 of electrodes 14 and 16. By this, water 50 has plasma emitted to it not just from the outside, but also from the inside, such that plasma processing is performed efficiently on water 50. Further, bubbles generated by bubble generating device 22 are extremely tiny bubbles, and remain inside water 50 for a long time. Therefore, plasma is emitted for a long time inside water 50, meaning that plasma processing of water 50 is performed efficiently.

In this way, with plasma emitting device 10, because plasma is emitted to flowing water 50, it is possible to generate a large quantity of plasma-processed water. Also, because plasma is emitted to water 50 that is flowing, it is possible to prevent an increase in the temperature of the plasma-processed water due to plasma being emitted. Further, with plasma emitting device 10, because processing gas 56 flows inside main body section 12, processing gas 56 is plasmarized continuously. By this it is possible to emit plasma to water 59 under stable conditions.

Also, with plasma emitting device 10, flow pipe 20 for flowing water 50 through the inside of main body section 12 is inserted inside main body section 12. Thus, water 50 can flow inside main body section 12 without being affected by processing gas 56 flowing inside main body section 12. That is, it is possible to curtail rippling of water 50 caused by processing gas 56 flowing inside main body section 12. However, at the location where water 50 and processing gas 56 first meet, although small, there is an issue of water 50 rippling. Considering this, the end of flow pipe 20 inserted inside main body section 12 is positioned between a position corresponding to the location where electrode 14 is vacuum deposited and the end of main body section 12 into which flow pipe 20 is inserted. Thus, it is possible to curtail water rippling when water 50 flows to a position corresponding to the location where electrode 14 is vacuum deposited, such that it is possible to maintain appropriate emitting of plasma to water 50.

Also, with plasma emitting device 10, because electrodes 14 and 16 are covered by glass pipe 18, electrical discharge at the outer circumferential surface of main body section 12 is curtailed. Further, because glass pipe 18 is inserted to between electrical discharge section 26 of electrode 14 and electrical discharge section 28 of electrode 16, electrical discharge between adjacent electrical discharge section 26 and electrical discharge section 28 is curtailed. Thus, electrical discharge occurs efficiently inside main body section 12 and the processing gas is plasmarized efficiently.

Alternative Embodiment 1

Figure 4:
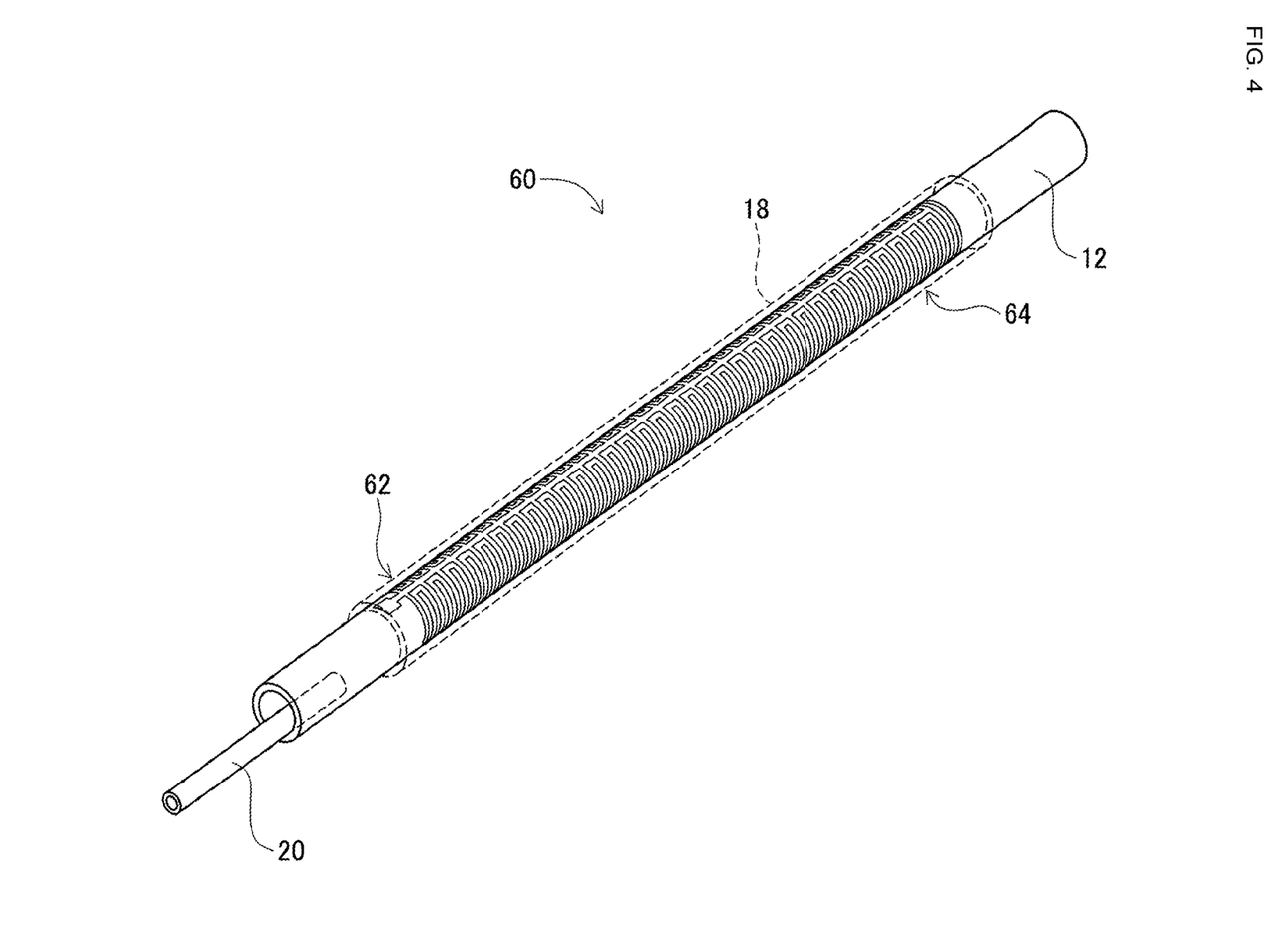
FIG. 4 is a perspective view showing a first alternative embodiment of the plasma emitting device.

The above is not limited to plasma emitting device 10 and may be applied to plasma emitting devices with a variety of constructions. Specifically, for example, the above may be applied plasma emitting device 60 shown in FIG. 4. Except for electrodes 62 and 64, plasma emitting device 60 is provided with the same configuration elements as plasma emitting device 10 of the first embodiment. Therefore, the same reference numbers are given to configuration elements that are the same as configuration elements of plasma emitting device 10 and descriptions of those items are omitted.

Figure 5:
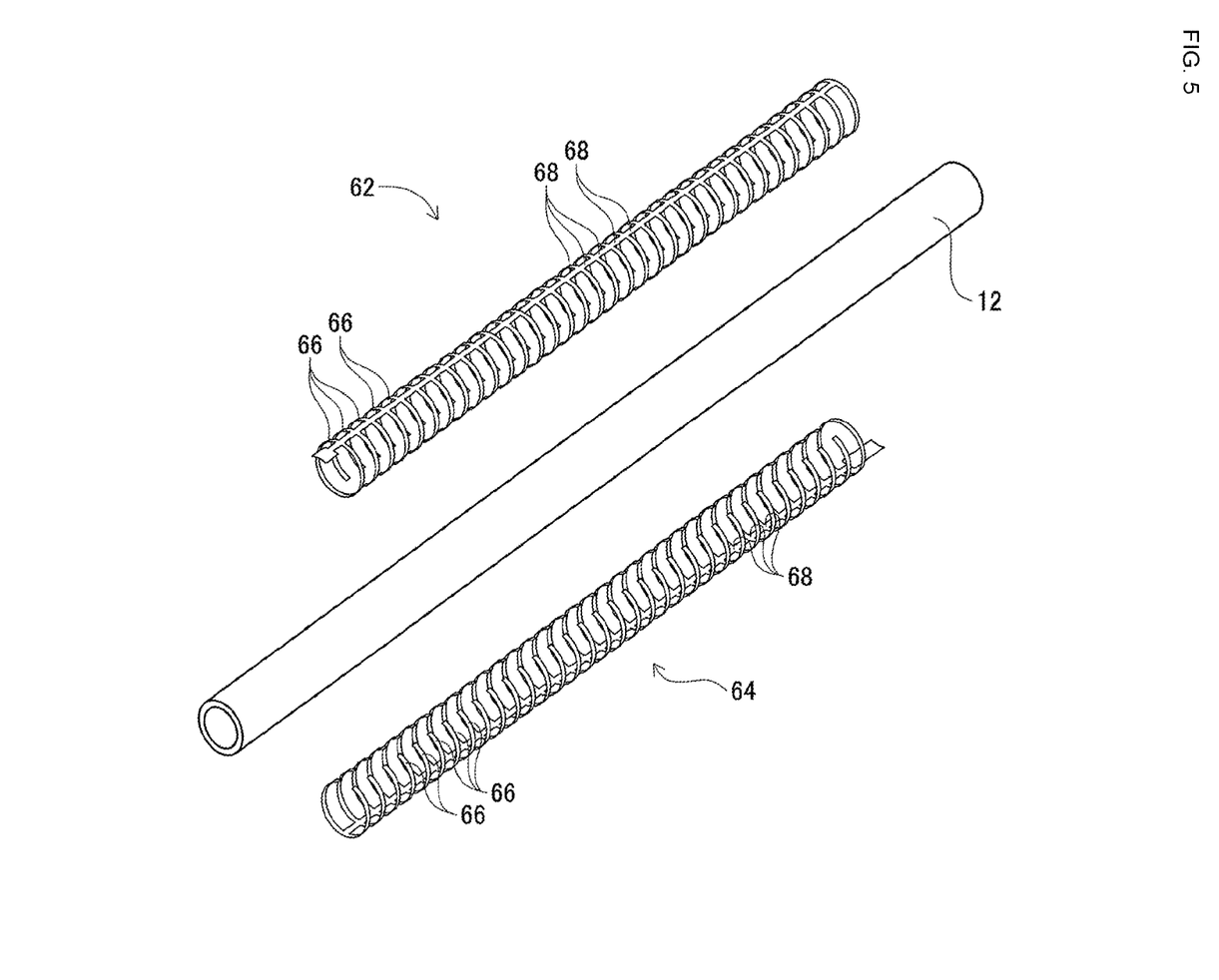
FIG. 5 is an exploded view showing electrodes removed from the main body section of FIG. 5.

Similar to electrodes 14 and 16 of plasma emitting device 10, electrodes 62 and 64 of plasma emitting device 60 are vacuum deposited on the outer circumferential surface of main body section 12. As shown in FIG. 5, electrodes 62 and 64 include multiple electrical discharge sections 66 and multiple connecting sections 68. FIG. 5 is a theoretical view showing electrodes 62 and 64 removed from main body section 12. Electrical discharge sections 66 of electrodes 62 and 64 are formed similar to electrical discharge sections 26 and 28 of electrodes 14 and 16 of plasma emitting device 10, only narrower. Also, connecting sections 68 of electrodes 62 and 64, in a similar manner to connecting sections 30 and 32 of electrodes 14 and 16 of plasma emitting device 10, are connected to multiple electrical discharge sections 66. And, similar to electrode 14 of plasma emitting device 10, electrode 62 is vacuum deposited on the outer circumferential surface of main body section 12; similar to electrode 16 of plasma emitting device 10, electrode 64 is vacuum deposited on the outer circumferential surface of main body section 12. That is, for plasma emitting device 60, the width of electrical discharge sections 26 and 28 of plasma emitting device 10 has been made narrower, and the quantity of electrical discharge sections 26 and 28 has been increased. By applying plasma emitting device 60 formed as such, it is possible to increase the electrical discharge amount and thus to efficiently plasmarize processing gas.

Alternative Embodiment 2

Figure 6:
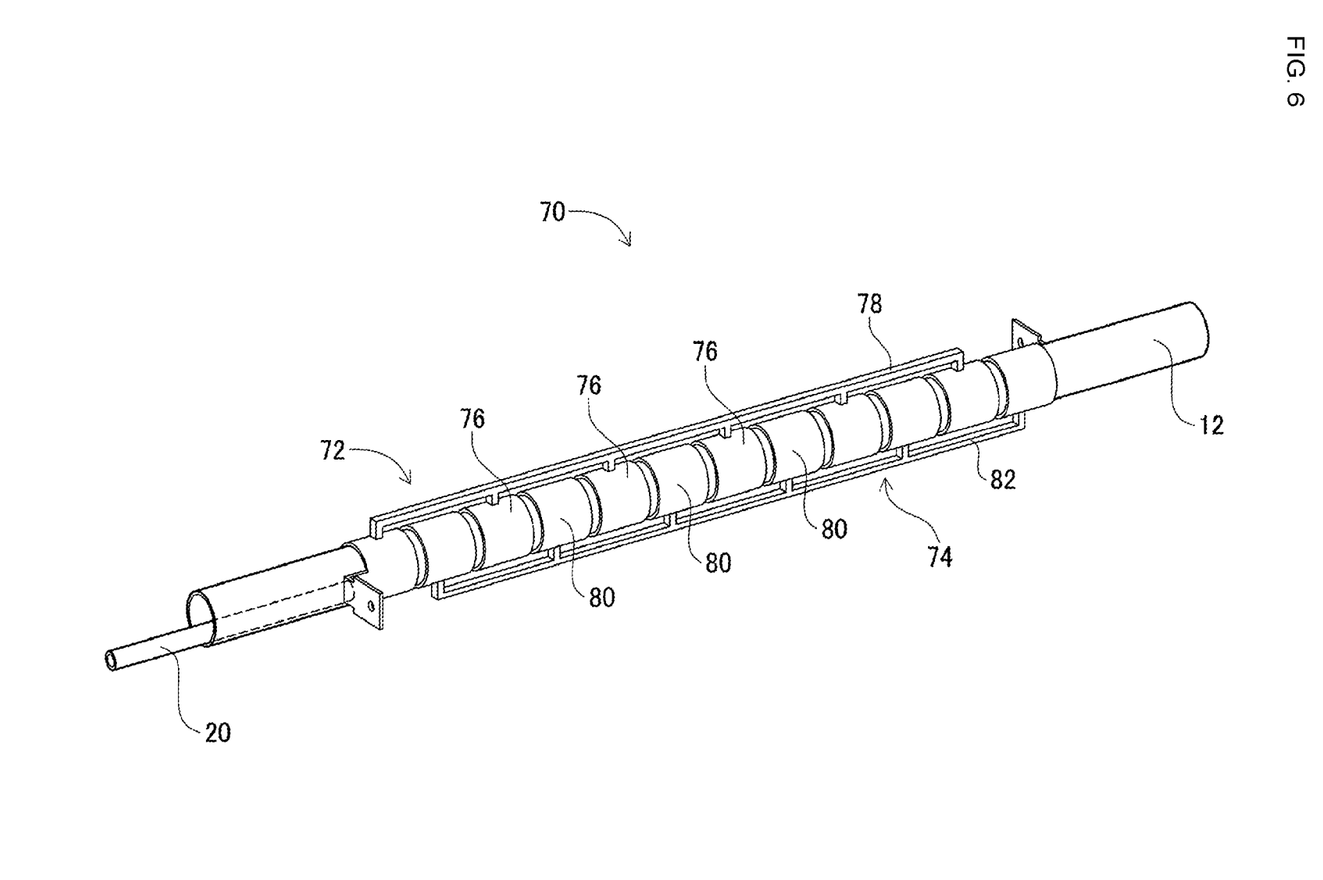
FIG. 6 is a perspective view showing a second alternative embodiment of the plasma emitting device.

Also, for example, it is possible to apply plasma emitting device 70 shown in FIG. 6. Except for electrodes 72 and 74, plasma emitting device 70 is provided with the same configuration elements as plasma emitting device 10 of the first embodiment. Therefore, the same reference numbers are given to configuration elements that are the same as configuration elements of plasma emitting device 10 and descriptions of those items are omitted. Note that, although not shown in the figures, plasma emitting device 70 is sealed using an insulating body such as glass.

Figure 7:
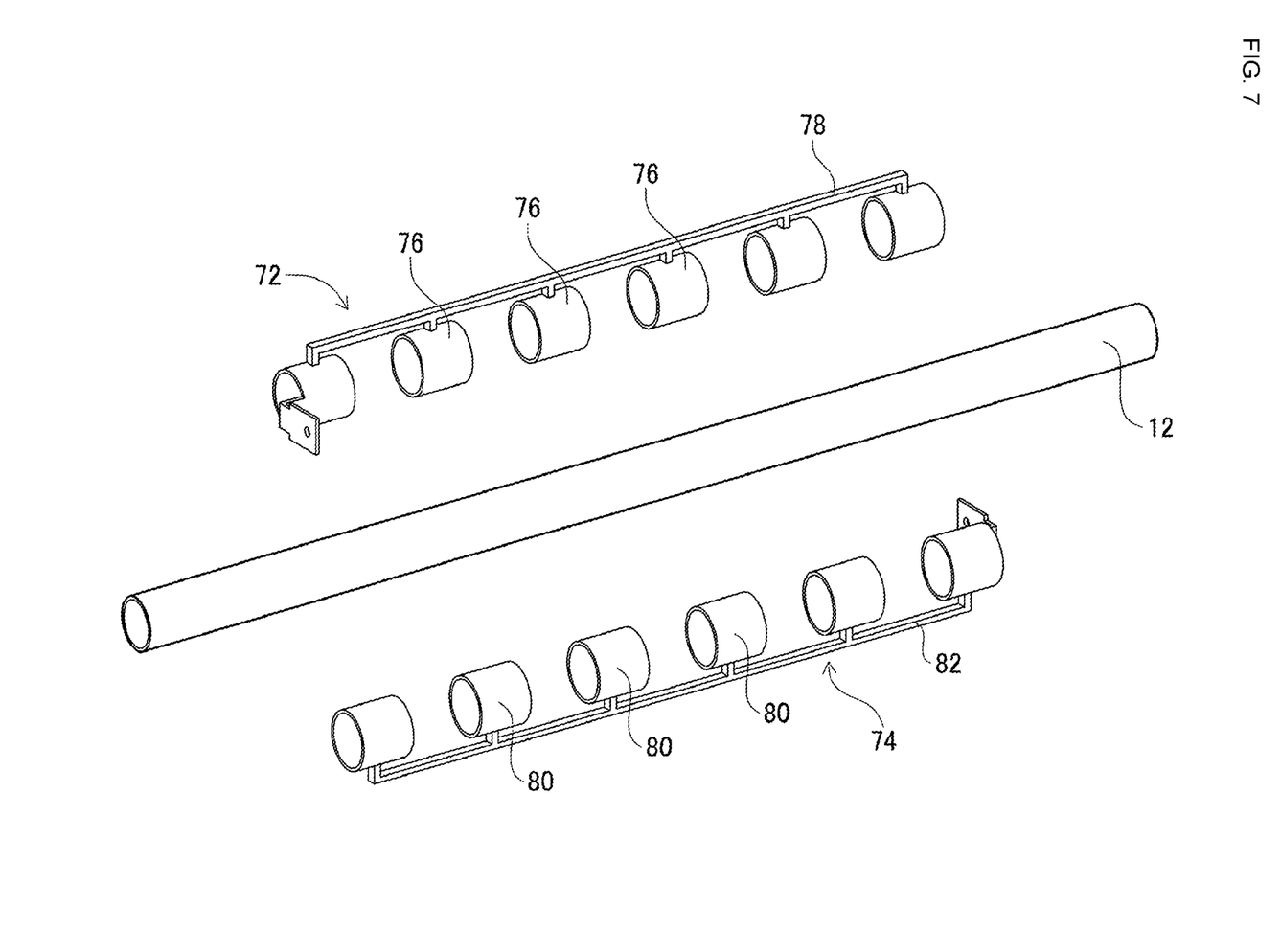
FIG. 7 is an exploded view showing electrodes removed from the main body section of FIG. 6.

As shown in FIG. 7, electrode 72 of plasma emitting device 70 includes multiple electrical discharge sections 76 and connecting section 78; electrode 74 includes multiple electrical discharge sections 80 and connecting section 82. FIG. 7 is a theoretical view showing electrodes 72 and 74 removed from main body section 12.

The multiple electrical discharge sections 76 and 80 of electrodes 72 and 74 are substantially tubular, with the internal diameter of electrical discharge sections 76 and 80 being slightly larger than the outer diameter of main body section 12. And, electrical discharge section 76 and electrical discharge section 80 are engaged on the outer circumferential surface of main body section 12 lined up alternately in the axis line direction of main body section 12 at a specified interval. Also, connecting section 78 of electrode 72 is arranged in a state slightly separated from electrical discharge sections 76 and 80 in the diameter direction, and is connected to multiple electrical discharge sections 76. Conversely, connecting section 82 of electrode 74 is arranged in a state slightly separated from electrical discharge sections 76 and 80 in the diameter direction on the opposite side to connecting section 78 of electrode 72, and is connected to multiple electrical discharge sections 80. Thus, pair of electrodes 72 and 74 are arranged on the outer circumferential surface of main body section 12 with electrical discharge sections 76 and 80 of electrodes 72 and 74 lined up alternately at a specified interval. It is also possible to suitably generate plasma-processed water using plasma emitting device 70 of the above configuration.

Alternative Embodiment 3

Figure 8:
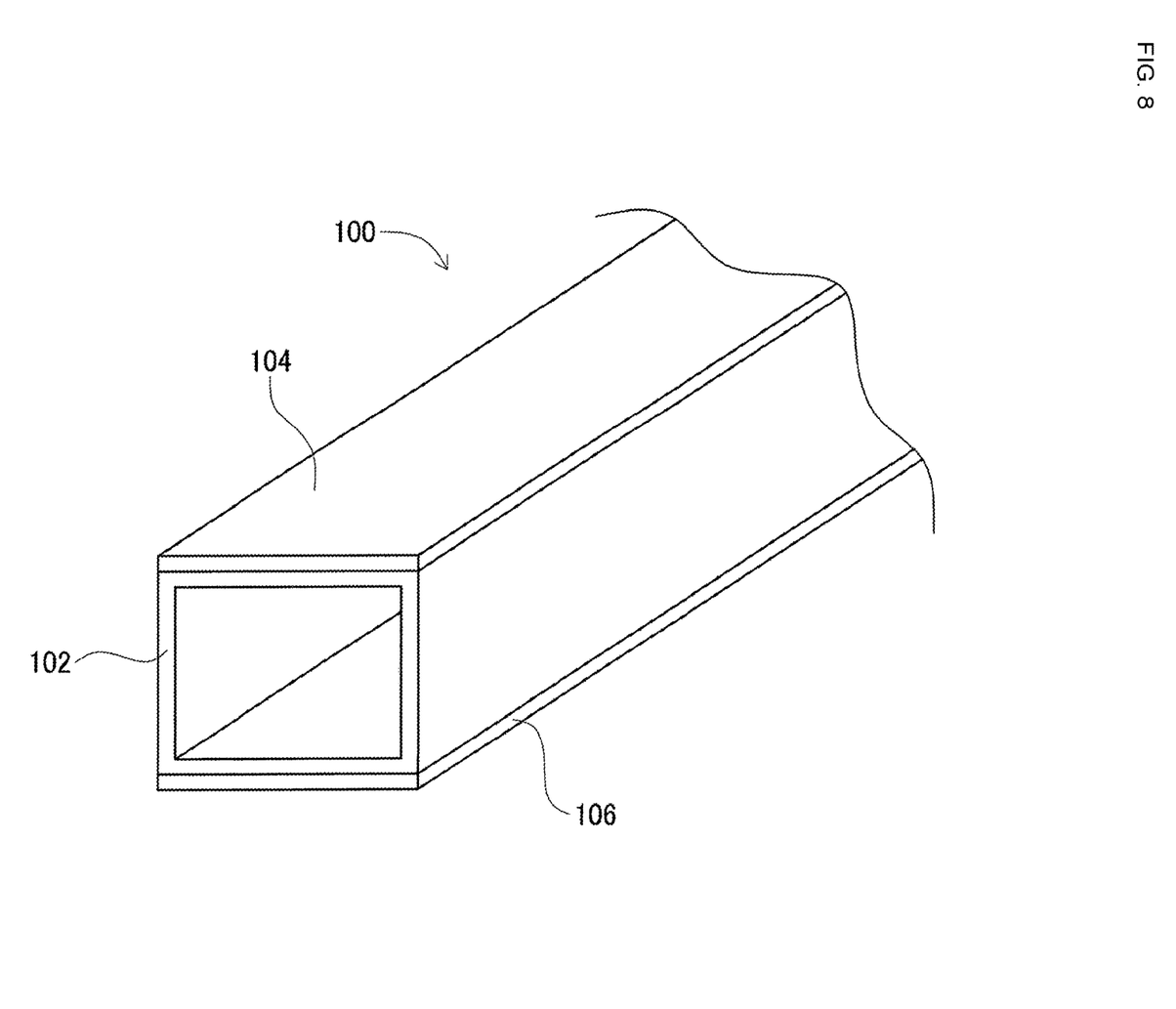
FIG. 8 is a perspective view showing a third alternative embodiment of the plasma emitting device.

With the above embodiments of plasma emitting devices 10, 60, and 70, a round tubular main body section 12 is used, but it is also possible to use a rectangular tube for a main body section. Specifically, as shown in FIG. 8, plasma emitting device 100 is provided with rectangular tube main body section 102 and pair of electrodes 104 and 106. Main body section 102 is formed from sapphire glass and has a rectangular cross section. Electrodes 104 and 106 are flat and are arranged on a pair of outer walls of main body section 102 opposite each other.

Also, plasma emitting device 100 is provided with a flow pipe (not shown) that has outer dimensions smaller than the internal dimensions of main body section 102; that flow pipe is inserted inside main body section 102 such that an end of the flow pipe is positioned inside main body section 102. Note that, the flow pipe has similar functionality to flow pipe 20 of plasma emitting device 10. Also, a bubble generating device (not shown) with a configuration similar to bubble generating device 22 of plasma emitting device 10 is provided on the flow pipe that is inserted inside main body section 102 at a location not inserted inside main body section 102.

Similar to plasma emitting device 10, with plasma emitting device 100 according to this configuration, it is possible to generate plasma-processed water. In detail, water containing bubbles is flowed inside main body section 102 via the flow pipe. Also, processing gas is supplied from between the flow pipe inserted into main body section 102 and main body section 102. Further, voltage is applied to the pair of electrodes 104 and 106 such that current flows through the pair of electrodes 104 and 106. Here, electrical discharge occurs between the pair of electrodes 104 and 106, that is, inside main body section 102, such that processing gas flowing inside main body section 102 is plasmarized. By this, plasma is emitted to water flowing inside main body section 102. In this way, similar to plasma emitting device 10, with plasma emitting device 100 as well, it is possible to generate plasma-processed water.

Note that, plasma emitting device 10 is an example of a plasma emitting device. Main body section 12 is an example of a tubular member. Electrodes 14 and 16 are each an example of an electrode. Glass pipe 18 is an example of a cover member. Flow pipe 20 is an example of a flow device. Bubble generating device 22 is an example of a bubble generating device. Electrical discharge sections 26 and 28 are each an example of an electrical discharge section. Plasma emitting device 60 is an example of a plasma emitting device. Electrodes 62 and 64 are each an example of an electrode. Electrical discharge section 66 is an example of an electrical discharge section. Plasma emitting device 70 is an example of a plasma emitting device. Electrodes 72 and 74 are each an example of an electrode. Electrical discharge sections 76 and 80 are each an example of an electrical discharge section. Plasma emitting device 100 is an example of a plasma emitting device. Main body section 102 is an example of a tubular member. Electrodes 104 and 106 are each an example of an electrode.

The method of emitting plasma to water using plasma emitting devices 10, 60, 70, and 100 is an example of a plasma emitting method. The step of flowing water inside main body section 12 and 102 is an example of a liquid flowing step. The step of plasmarizing processing gas using electrodes 14 and 16, 62 and 64, 72 and 74, and 104 and 106 is an example of a plasmarizing step. The step of flowing processing gas inside main body section 12 and 102 is an example of a gas flowing step. The step of generating bubbles inside water using bubble generating device 22 is an example of a bubble generating step.

Further, the present disclosure is not limited to the above example embodiments, and various changed or improved methods of embodiment are possible based on the knowledge of someone skilled in the art. Specifically, for example, in the above embodiments, plasma is emitted to water; however, plasma may be emitted to various liquids.

REFERENCE SIGNS LIST

10: plasma emitting device; 12: main body section (tubular member); 14, 16: electrode; 18: glass pipe (cover member); 20: flow pipe (flow device); 22: bubble generating device; 26, 28: electrical discharge section; 60: plasma emitting device; 62, 64: electrode; 66: electrical discharge section; 70: plasma emitting device; 72, 74: electrode; 76, 80: electrical discharge section; 100: plasma emitting device; 102: main body section (tubular member); 104, 106: electrode

The invention claimed is:

1. A plasma emitting device comprising:
a tubular member formed from an insulating material;
a pair of electrodes arranged along an outer wall of the tubular member; and
a flow device that flows a liquid inside the tubular member such that a specified space remains inside the tubular member; wherein
plasma is emitted to the liquid flowing inside the tubular member by gas present in the specified space being plasmarized by voltage being applied to the pair of electrodes,
each of the electrodes includes multiple electrical discharge sections provided extending in a circumferential direction of the outer wall of the tubular member, each of the multiple electrical discharge sections connected by connecting sections that extend in the axis direction of the tubular member; and
the electrical discharge sections of one of the pair of electrodes and the electrical discharge sections of the other of the pair of electrodes are alternately spaced apart extending in the axis direction of the tubular member.

2. The plasma emitting device according to claim 1, wherein
an outlet that ejects the liquid of the flow device is provided inside the tubular member.

3. The plasma emitting device according to claim 1, wherein
the plasma emitting device is provided with a bubble generating device for generating bubbles in the liquid that is flowed inside the tubular member.

4. The plasma emitting device according to claim 1, wherein
the plasma emitting device is provided with a cover member formed of insulating material that covers the pair of electrodes arranged along outer wall of the tubular member.

5. The plasma emitting device according to claim 1, wherein
the multiple electrical discharge sections and the connecting sections are vacuum deposited on the outer wall of the tubular member.

* * * * *